(12) United States Patent
Mysker

(10) Patent No.: US 7,404,758 B2
(45) Date of Patent: Jul. 29, 2008

(54) APPARATUS AND METHOD TO NET FOOD PRODUCTS IN SHIRRED TUBULAR CASING

(75) Inventor: Thomas Mysker, Twin Lakes, WI (US)

(73) Assignee: Poly-Clip System Corp., Mundelein, IL (US)

( * ) Notice: Subject to any disclaimer, the term of this patent is extended or adjusted under 35 U.S.C. 154(b) by 454 days.

(21) Appl. No.: 10/695,115

(22) Filed: Oct. 28, 2003

(65) Prior Publication Data
US 2005/0101240 A1    May 12, 2005

(51) Int. Cl.
*A22C 11/00* (2006.01)
(52) U.S. Cl. ......................................... 452/30
(58) Field of Classification Search ............. 452/32–35, 452/37, 46, 48, 51
See application file for complete search history.

(56) References Cited

U.S. PATENT DOCUMENTS

| | | | |
|---|---|---|---|
| 2,922,186 A * | 1/1960 | Sartore .......................... | 452/35 |
| 3,014,024 A | 12/1961 | Leiberman | |
| 3,805,480 A * | 4/1974 | Cherio et al. ................... | 53/64 |
| 4,133,164 A * | 1/1979 | Mintz ........................... | 53/261 |
| 4,466,465 A * | 8/1984 | Frey .......................... | 138/118.1 |
| 4,525,895 A * | 7/1985 | Raudys .......................... | 452/39 |
| 4,621,482 A | 11/1986 | Crevasse et al. | |
| 4,716,713 A | 1/1988 | Crevasse et al. | |
| 4,719,116 A | 1/1988 | Crevasse | |
| 4,771,510 A * | 9/1988 | Kawai .......................... | 452/35 |
| 4,910,034 A | 3/1990 | Winkler | |
| 4,924,552 A * | 5/1990 | Sullivan ........................ | 452/24 |
| 4,958,477 A | 9/1990 | Winkler | |
| 5,024,041 A * | 6/1991 | Urban et al. ................... | 53/449 |
| 5,135,770 A * | 8/1992 | Underwood .................. | 426/650 |
| 5,156,567 A | 10/1992 | Gammon et al. | |
| 5,215,495 A | 6/1993 | Crevasse | |
| 5,273,481 A * | 12/1993 | Sullivan ........................ | 452/24 |
| 5,698,279 A * | 12/1997 | Vicik .......................... | 428/34.8 |
| 6,416,832 B1 * | 7/2002 | Uehara et al. ............... | 428/34.8 |

* cited by examiner

Primary Examiner—Thomas Price
(74) Attorney, Agent, or Firm—Trexler, Bushnell, Giangiorgi, Blackstone & Marr, Ltd

(57) ABSTRACT

An apparatus and method to net food products in shirred tubular casing, in order to create a highly-dimpled foot product. A filling horn, shir housing, and netting tube allow for the extrusion of food products into an edible tubular collagen film, which itself expands into a netting of a smaller diameter than that of the film. As the food product under pressure expands against the tubular film, it presses through the spaces in the netting to created a dimpled appearance. After the food product has been further processed, the netting is removed, leaving the food product with a highly-dimpled appearance.

14 Claims, 4 Drawing Sheets

FIG. 4

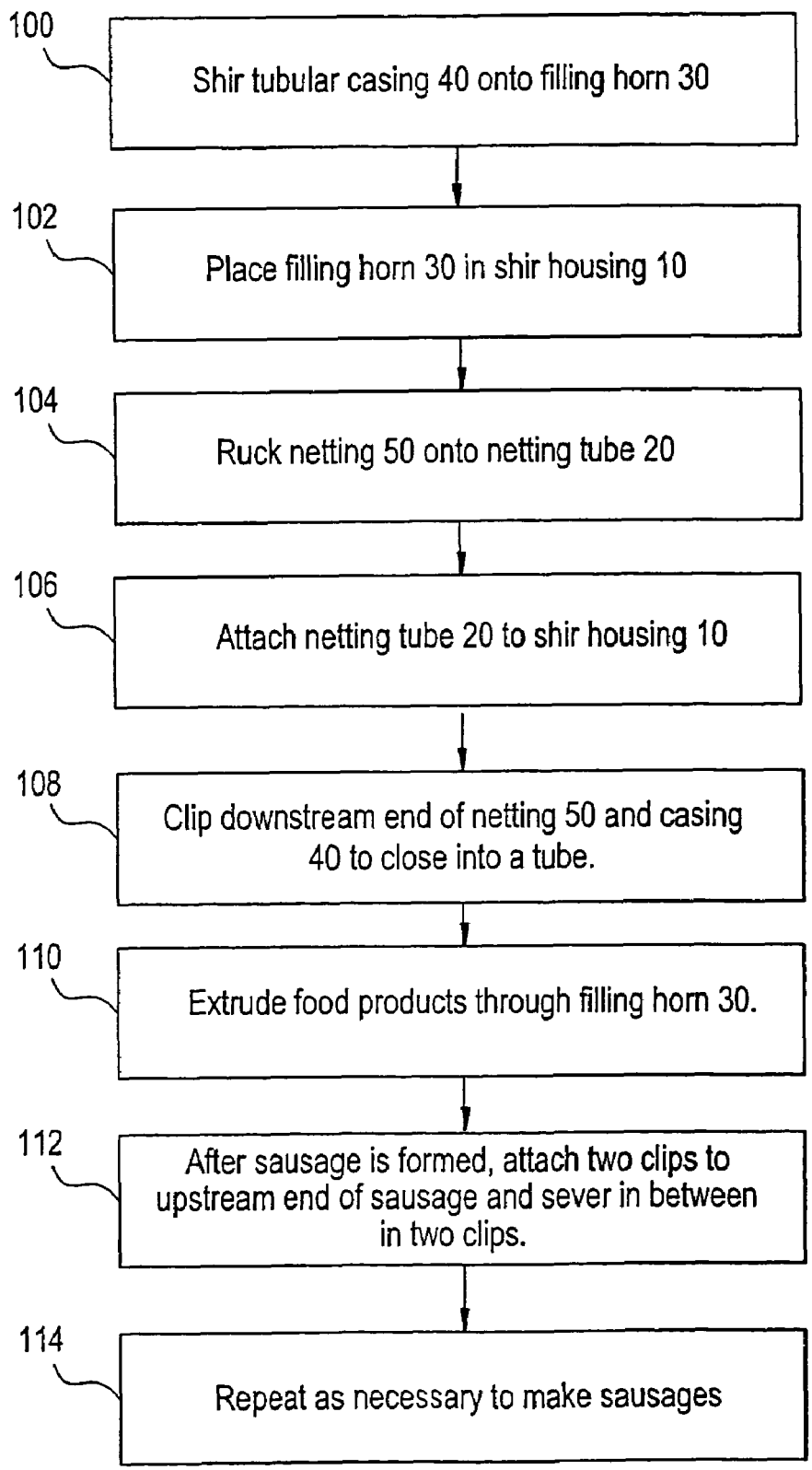

- 100 — Shir tubular casing 40 onto filling horn 30
- 102 — Place filling horn 30 in shir housing 10
- 104 — Ruck netting 50 onto netting tube 20
- 106 — Attach netting tube 20 to shir housing 10
- 108 — Clip downstream end of netting 50 and casing 40 to close into a tube.
- 110 — Extrude food products through filling horn 30.
- 112 — After sausage is formed, attach two clips to upstream end of sausage and sever in between in two clips.
- 114 — Repeat as necessary to make sausages

APPARATUS AND METHOD TO NET FOOD PRODUCTS IN SHIRRED TUBULAR CASING

BACKGROUND OF THE INVENTION

This invention relates to the field of preparing food products in shirred, tubular casings and enclosing the products in netting. As used in this specification, the term "shir" refers to the process of gather a continuous tube of casing material over a tube or horn. The term "ruck" means to shir netting over a tube or horn. Traditionally, meat products were wrapped in netting prior to processing. Removal of the netting after processing, whether it be cooking smoking, curing, aging, or otherwise, often resulted in some of the meat products sticking to the netting and being pulled off during the removal process, leaving an unsightly appearance unpleasant to consumers. Later, the use of edible collagen films solved this problem. Meat products, including sausages and whole-muscle products, are now conventionally enveloped into a tubular shape in an edible collagen film. In the prior art, flat sheets of collagen film are turned over plows to form a sausage casing. The casing is then wrapped in a net and the product is further processed, such as cooking, aging, or smoking. After processing, the netting is removed easily, as it does not stick to the collagen film. Various collagen films can be used, including flavored and colored films, to create various taste sensations or appearances.

The use of flat sheets of collagen films requires the use of complicated plows and guides, as noted in U.S. Pat. No. 4,958,477 to Winkler. The use of such an arrangement requires extended set up time and diligent supervision during operation. This method also produces quite a bit of overlap of film and allows food product to leak at the seams if insufficient overlap is not present. Accordingly, this method inefficiently wastes film.

The use of netting provides a mesh appearance on the surface of the food products. Having a dimpled appearance, however, is considered more appealing to consumers.

Accordingly, a need exists for a simpler, more efficient, easier way to encase food products in collagen film, requiring less set up time, less supervision, and producing a highly-dimpled end product. The present invention fills this need.

BRIEF SUMMARY OF THE INVENTION

The present invention include the use of tubular shirred casing, rather than sheets of casing film, and the extrusion of the food products into a casing of smaller diameter than the netting, which will cause the netting to constrict around the casing, leaving a dimpled appearance. Food products, either sausages or whole-muscle meats, are extruded through a tube or horn into a shir housing on which a tubular edible collagen film has been shirred. The shir housing is coaxial to a netting tube on which netting, of smaller diameter than that of the collagen film, has been shirred. As the food products exit the shir housing, they expand the collagen film, pushing that tubular film outwards and against the netting. Since the collagen film is of a larger diameter than the netting, the pressure of the food products against the collagen film creates a dimpled appearance in that film.

It is an object of this invention to create an apparatus and method of packing food products in a tubular edible collagen film, rather than wrapping the food products in cylindrical form in flat sheets of collagen film. It is a further object of this invention to package the food products in a tubular collagen film of a smaller diameter than the netting, in order to emphasize the dimpled appearance of the products. Although the invention will be described for the use of sausage, it can be used for any product, including whole-muscle meats, cheeses, vegetarian sausage, or any other product in which a dimpled appearance is desired.

BRIEF DESCRIPTION OF THE DRAWINGS

FIG. 4 is a flow diagram of the method of the present invention.

BRIEF SUMMARY OF THE INVENTION

The organization and manner of the method of the preferred embodiments of the invention, together with further objects and advantages thereof, may best be understood by reference to the following description, taken in connection with the drawings.

Figure 1:
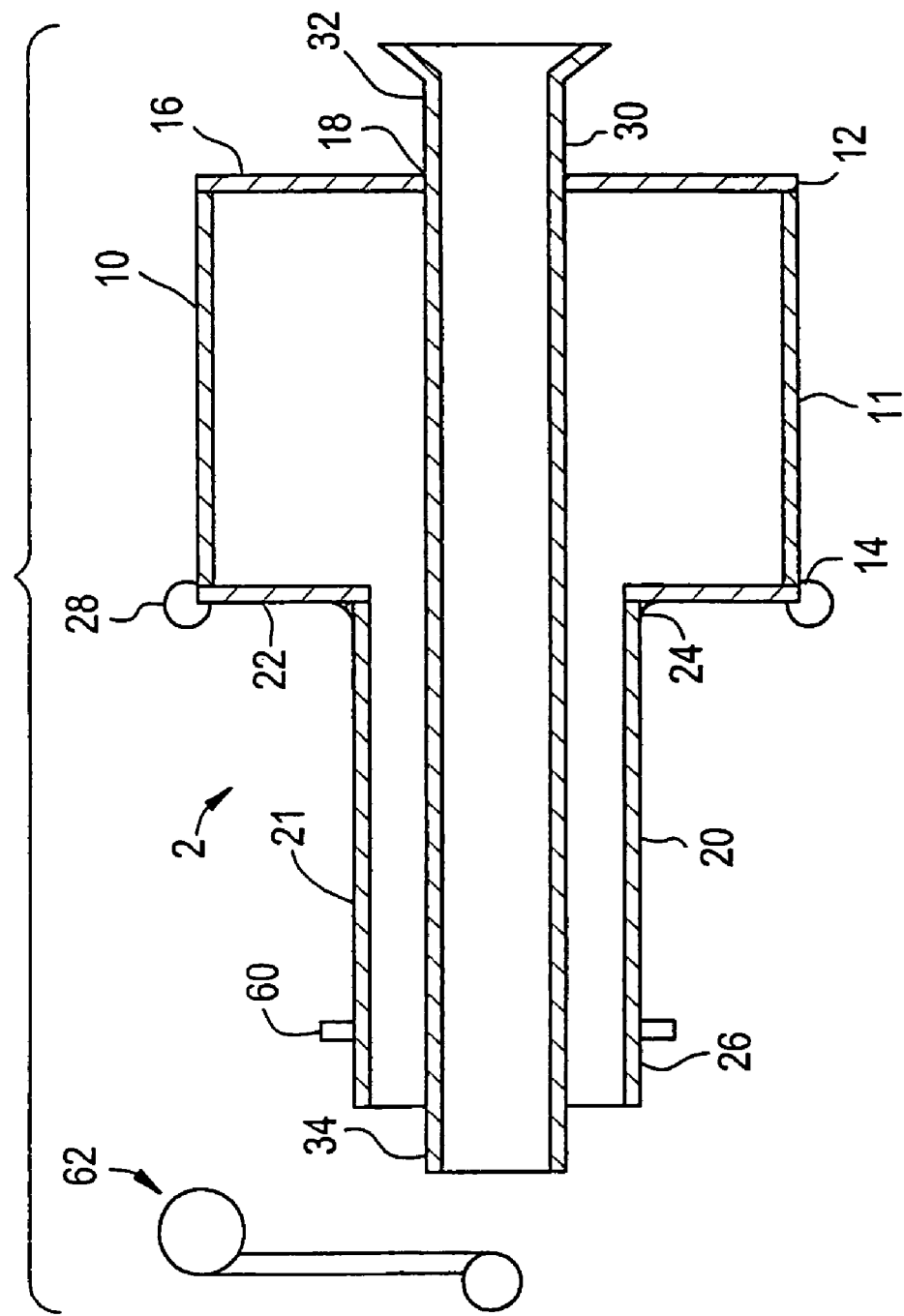
FIG. 1 is a cross-sectional view of the apparatus of one embodiment of the present invention.
Figure 2:
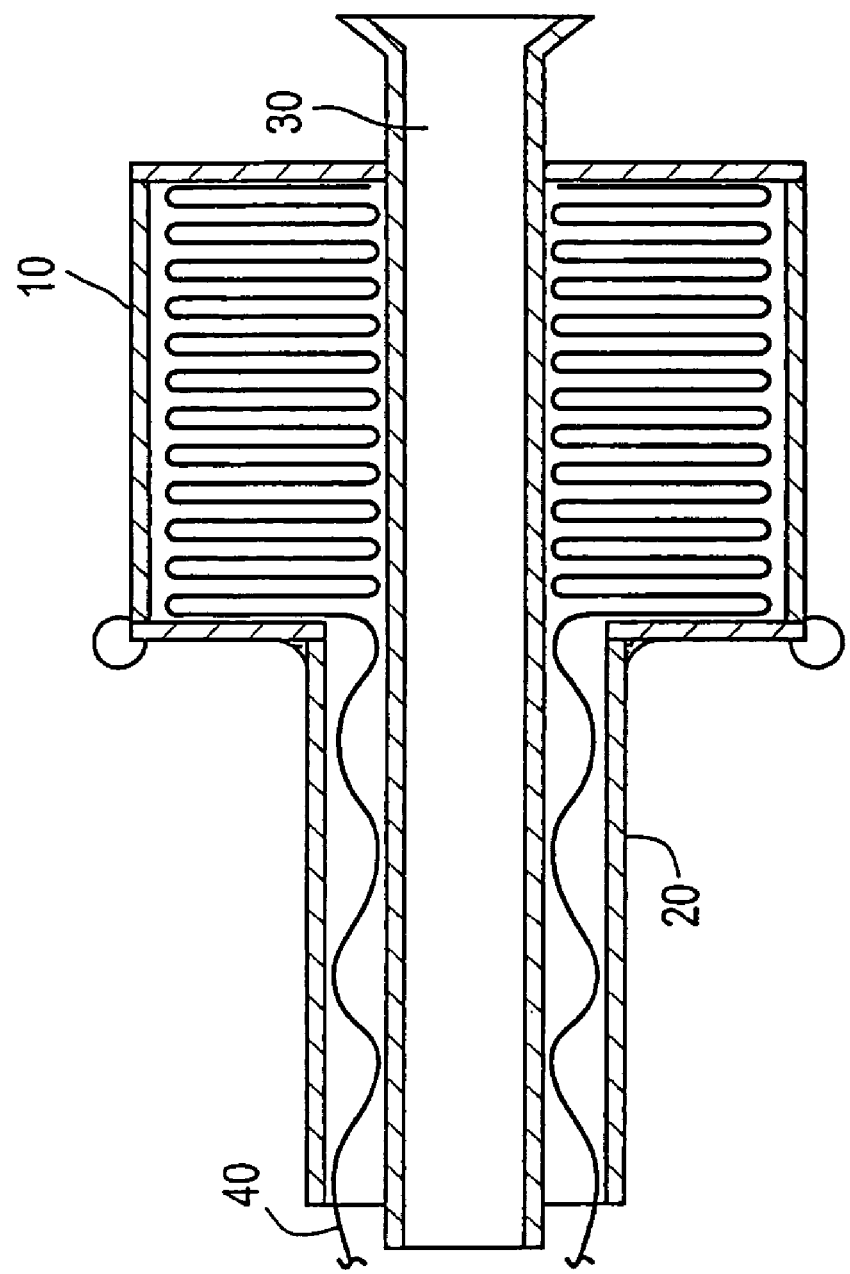
FIG. 2 is a cross-sectional view of an embodiment of the apparatus of the present invention showing the film shirred thereon.
Figure 3:
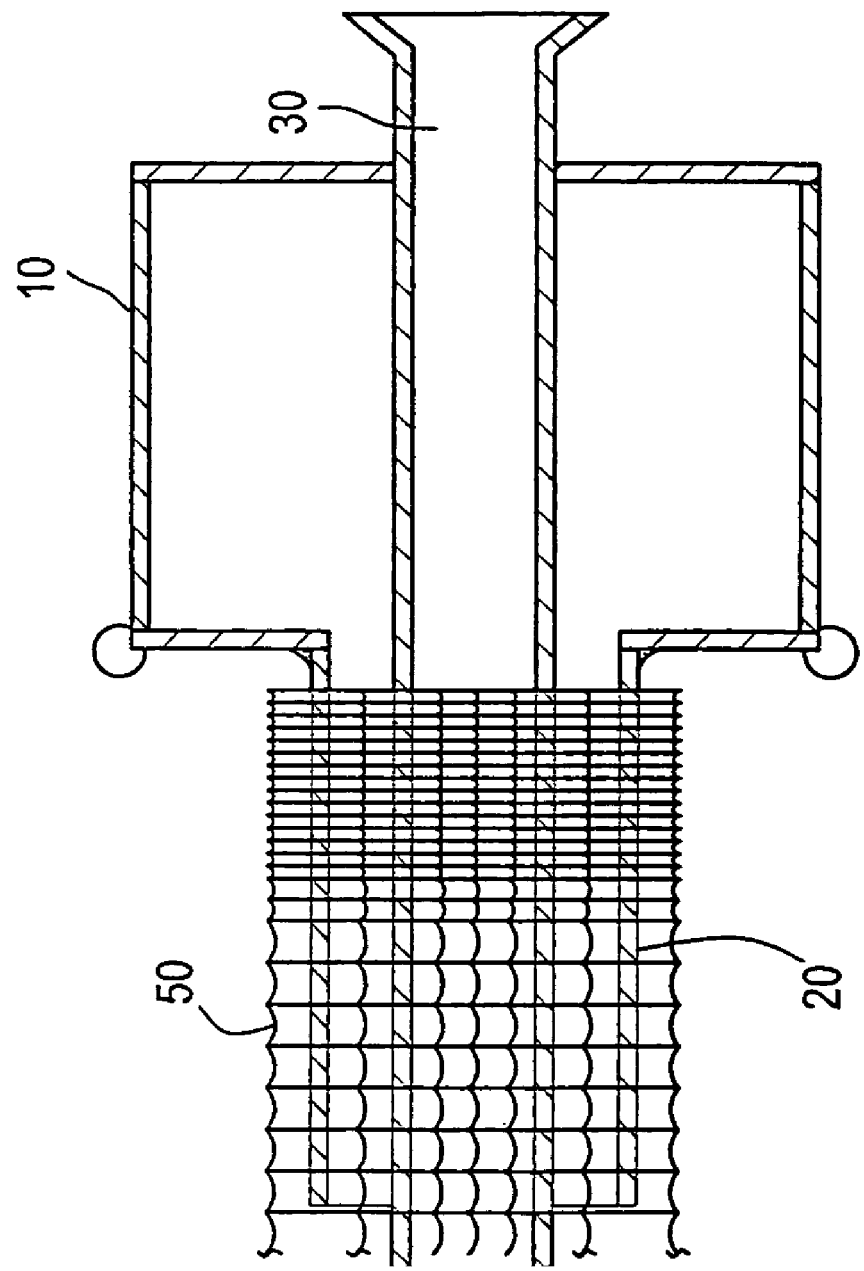
FIG. 3 is a cross-sectional view of an embodiment of the apparatus of the present invention showing the netting rucked thereon.

The apparatus 2 comprises a shir housing 10, a netting tube 20, and a filling horn 30, as shown in FIG. 1. The filling horn 30 is a long tube that releasably attaches to and protrudes horizontally from a standard food preparation apparatus, not pictured, such as a conventional sausage-making machine. Tubular edible collagen film 40 is shirred onto the filling horn 30 prior to use. FIG. 2 illustrates the filling horn 30 with the film 40 shirred onto the filling horn 30.

The shir housing 10 comprises a tube 11 of larger diameter than that of the filling horn 30 and a back plate 16. In the preferred embodiment, the shir housing 10 has a seven-inch diameter while the filling horn 30 has a three-inch diameter. The tube of the shir housing 10 is welded at its upstream end 12 to a back plate 16. The back plate 16 attaches to the sausage-making machine and contains an aperture 18 through which the filling horn 30 extends. Accordingly, the filling horn 30 is coaxial to and inside of the shir housing 10. The filling horn 30 can either sit snugly within the aperture 18, or can be sealed with a suitable gasket, or can be welded directly to the back plate 16.

The netting tube 20 comprises an elongated tube 21 welded to a transition plate 22 at its upstream end 24. The netting tube 20 holds netting 50 in a conventional way, such as outer tube 24 as described in U.S. Pat. No. 4,958,477. The netting tube 20 of the present invention, however, unlike the outer tube of the '477 patent, attaches to the shir housing 10. Preferably, fasteners sold under the brand name Quick Locks® are used, but any convenient means of attachment will suffice, such as bayonet pins, locking pins, threaded fasteners, interference fit, or anything else that attaches the transition plate 22 of the netting tube 20 to the shir housing 10. The netting 50 of the present invention is of a smaller diameter than the diameter of the tubular film 40.

Please note that the netting tube 20 is of an intermediate diameter to that of the shir housing 10 and the filling horn 30. In the preferred embodiment, the netting tube has a diameter of four inches.

A break ring 60 can be placed on the downstream end 26 of the netting tube 20, to rectify the release of netting 50 from the netting tube. Preferably, however, a derucking rectifier is used in order to obtain sausages of consistent length.

In use, therefore, the filling horn 30 protrudes from the sausage-making machine and has a length of tubular edible collagen film 40 shirred onto it. The film 40 is protected by the shir housing 10 which surrounds the netting tube 20 near the upstream end 24 of the netting tube 20. The netting tube 20 extends downstream from the shir housing 10 and holds the netting 50 in place. A conventional clipper 62 is located at the downstream end 34 of the filling horn 30.

The method of the present invention is illustrated in block diagram form in FIG. 4. In use, the tubular film 40 is shirred onto the filling horn 30 (step 100) and past the downstream end 32 of the filling horn 30, which is then placed on the shir housing (step 100). The netting tube 20, with netting 50 rucked onto it (step 104), is locked in place to the shir housing 10 (step 102) and over the filling horn 30, using means 28 (step 106). The end of the netting 50 and the end of the film 40 are clipped in a conventional manner (step 108). This clip will become one end of the first sausage made by the apparatus 2. (Please note, however, that the first sausage is likely to contain quite a bit of air. It is recommended to bleed as much air out of the system as possible before applying the first clip.)

The sausage meat, having been made in the sausage-making machine, is extruded under pressure in a conventional manner into the upstream end 32 of the filling horn 30 (step 110). As the sausage meat progresses down the filling horn 30, it pushes the tubular film 40 off the filling horn 30 and out the downstream end of the apparatus 2. As the film 40 is pushed off the filling horn 30, it expands outward against the netting 50. Since the netting 50 is of a smaller diameter than that of the film 40, the film 40 will bulge through the spaces in the netting 50, creating the dimpled appearance that is an object of the invention.

After a sufficient length of sausage has been extruded, the clipper 62 squeezes the netting 50 and film 40, applies two clips, and severs the sausage in a conventional manner (step 112). The sausage is now ready for further processing. The process continues as set forth above (step 114).

While preferred embodiments of the present invention are shown and described, it is envisioned that those skilled in the art may devise modifications of the present invention without departing from the spirit and scope of the appended claims.

I claim:

1. An apparatus to net a food product in shirred tubular casings, comprising:
    a filling horn adapted to received extruded food products and having an outside diameter on which a tubular casing having a filled diameter has been shirred, said outside diameter being less than said filled diameter; and
    a shir housing having a diameter greater than said outside diameter of said filling horn and located coaxially to said filling horn; and
    a netting tube releasably attachable to said shir housing and on which tubular netting having a diameter less than said filled diameter of said tubular casing has been rucked, said netting tube having a diameter intermediate to said outside diameter of said filling horn and said diameter of said shir housing.

2. The apparatus of claim 1, further comprising a clipper.

3. The apparatus of claim 1, wherein said tubular casing is edible.

4. The apparatus of claim 1, wherein said tubular casing is dyed.

5. The apparatus of claim 4, wherein said tubular casing is dyed in a pattern.

6. The apparatus of claim 1, wherein said tubular casing further comprises flavoring.

7. The apparatus of claim 1, wherein said flavoring comprises smoke flavoring.

8. A method of preparing food products in netted tubular casings, comprising:
    shirring tubular casing having a filled diameter on a filling horn having an outside diameter, said outside diameter being less than said filled diameter;
    placing said filling horn in a shir housing having an inside diameter greater than said outside diameter of said filling horn;
    rucking a tubular netting having a diameter less than said filled diameter of said filling horn onto a netting tube, said netting tube having a diameter intermediate to said outside diameter of said filling horn and said inside diameter of said shir housing;
    attaching said netting tube to said housing;
    extruding food products through said filling horn, whereby the food products expand said tubular casing against said netting to create a dimpled appearance in the food product.

9. The method of claim 8, further comprising a clipper.

10. The method of claim 8, wherein said tubular casing is edible.

11. The method of claim 8, wherein said tubular casing is dyed.

12. The method of claim 11, wherein said tubular casing is dyed in a pattern.

13. The method of claim 8, wherein said tubular casing further comprises flavoring.

14. The method of claim 13, wherein said flavoring comprises smoke flavoring.

* * * * *